United States Patent
Guo

(10) Patent No.: US 10,277,164 B2
(45) Date of Patent: Apr. 30, 2019

(54) FLEXIBLE DUST SHIELD

(71) Applicant: QATAR FOUNDATION FOR EDUCATION, SCIENCE AND COMMUNITY DEVELOPMENT, Washington, DC (US)

(72) Inventor: Bing Guo, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 0 days.

(21) Appl. No.: 16/066,286

(22) PCT Filed: Feb. 17, 2017

(86) PCT No.: PCT/US2017/018485
§ 371 (c)(1),
(2) Date: Jun. 26, 2018

(87) PCT Pub. No.: WO2017/143268
PCT Pub. Date: Aug. 24, 2017

(65) Prior Publication Data
US 2019/0006986 A1    Jan. 3, 2019

Related U.S. Application Data

(60) Provisional application No. 62/296,580, filed on Feb. 17, 2016.

(51) Int. Cl.
*H02S 40/10*    (2014.01)
*B08B 6/00*    (2006.01)
(Continued)

(52) U.S. Cl.
CPC ............... *H02S 40/10* (2014.12); *B08B 6/00* (2013.01); *B08B 17/02* (2013.01); *B32B 7/12* (2013.01);
(Continued)

(58) Field of Classification Search
CPC .......... H02S 40/10; B08B 6/00; B08B 17/02; B32B 7/12; B32B 27/281; B32B 27/36;
(Continued)

(56) References Cited

U.S. PATENT DOCUMENTS 6,335,479 B1    1/2002    Yamada et al.
6,911,593 B2    6/2005    Mazumder et al.
(Continued)

FOREIGN PATENT DOCUMENTS

CN    103337524 A    10/2013
CN    203991498 U    12/2014
(Continued)

OTHER PUBLICATIONS

Calle et al., "Integration of the Electrodynamic Dust Shield on a Lunar Habitat Demonstration Unit", Proc. ESA Annual Meetingg on Electrostatics (2010), Paper D1 (7 sheets).
(Continued)

*Primary Examiner* — Michael C Miggins
(74) *Attorney, Agent, or Firm* — Richard C. Litman

(57) ABSTRACT

The flexible dust shield (10) is a dust cover for repelling dust particles from a photovoltaic solar collector panel, the exposed glass surfaces of a high-rise building façade or the like by action of an electric field. The dust shield (10) includes a pattern of electrodes (12) made from a conductive ink, such as silver ink or carbon ink, which is printed on a flexible substrate (14) made from a thermoplastic film. A cover sheet (16) of thermoplastic film is laminated to the substrate (14) over the pattern of electrodes (12). The electrodes (12) are adapted for attachment to a single phase or multi-phase alternating current signal, which generates an electric field for repelling dust particles.

17 Claims, 2 Drawing Sheets

(51) Int. Cl.
*B08B 17/02* (2006.01)
*B32B 7/12* (2006.01)
*B32B 27/28* (2006.01)
*B32B 27/36* (2006.01)
*B32B 37/18* (2006.01)
*B32B 38/00* (2006.01)

(52) U.S. Cl.
CPC ............ *B32B 27/281* (2013.01); *B32B 27/36* (2013.01); *B32B 37/182* (2013.01); *B32B 38/145* (2013.01); *B32B 2255/10* (2013.01); *B32B 2255/205* (2013.01); *B32B 2367/00* (2013.01); *B32B 2379/08* (2013.01); *B32B 2432/00* (2013.01); *B32B 2457/00* (2013.01); *Y02B 10/10* (2013.01)

(58) Field of Classification Search
CPC . B32B 37/182; B32B 38/145; B32B 2255/10; B32B 2255/205; B32B 2367/00; B32B 2379/08; B32B 2432/00; B32B 2457/00; Y02B 10/10
See application file for complete search history.

(56) References Cited

U.S. PATENT DOCUMENTS

| | | | |
|---|---|---|---|
| 6,988,925 | B2 | 1/2006 | Arthur et al. |
| 7,368,921 | B2 | 5/2008 | Deangelis et al. |
| 8,978,187 | B2 | 3/2015 | Maxik et al. |
| 2004/0055632 | A1 | 3/2004 | Mazumder et al. |
| 2011/0283477 | A1 | 11/2011 | Ashpis |
| 2012/0111599 | A1 | 5/2012 | Roberson et al. |
| 2013/0263393 | A1 | 10/2013 | Mazumder |
| 2013/0298399 | A1 | 11/2013 | Trigwell et al. |

FOREIGN PATENT DOCUMENTS

| | | |
|---|---|---|
| EP | 2647057 | 6/2012 |
| KR | 1020120132097 A | 12/2012 |
| WO | 2012078765 A2 | 6/2012 |

OTHER PUBLICATIONS

Mazumder et al., "Prototype Development of Self-Cleaning CSP Collectors", U.S. Department of Energy Sunspot Conference (Apr. 2013), 32 pages.

FLEXIBLE DUST SHIELD

TECHNICAL FIELD

The present invention relates to dust removal from glass surfaces and the like, and particularly to a flexible dust shield which is applied to a glass surface or the like for repelling dust therefrom with an electric field.

BACKGROUND ART

The efficiency of solar photovoltaic arrays may be greatly degraded by the deposition of dust particles thereon. Dust and similar contaminants on the glass surface of the photovoltaic panels reduces the amount of light entering the array. Dust also decreases the efficiency of other transparent optical surfaces, such as, for example, optical windows in cameras and other detectors, windshields, glass windows, such as those used in high-rise building façades, and the like. The problem of dust deposition is of particular importance in dry and windy climates, such as in arid desert regions. Although a wide variety of transparent covers are available, such covers simply form a barrier between the glass surface and the dust, and the covers then need to be constantly cleaned or replaced. A self-cleaning shield against dust accumulation would obviously be desirable. Thus, a flexible dust shield solving the aforementioned problems are desired.

DISCLOSURE OF INVENTION

The flexible dust shield is a dust cover for repelling dust particles from a photovoltaic solar collector panel, the exposed glass surfaces of a high-rise building façade or the like by action of an electric field. The dust shield includes a flexible substrate, a pattern of electrodes printed on the substrate, and a flexible cover sheet over the substrate and the electrodes. The substrate and the cover sheet can be from from a thermoplastic film and the electrodes can be formed from a conductive ink, such as silver ink or carbon ink. The electrodes are adapted for attachment to a single phase or multi-phase alternating current signal, which generates an electric field for repelling dust particles. The thermoplastic film can include, for example, a polyimide film or a polyethylene terephthalate film. The polyimide film can be Kapton®, manufactured by E. I. du Pont de Nemours and Company of Delaware.

To make the flexible dust shield, the pattern of electrodes are printed on the flexible substrate sheet of thermoplastic film. The printed pattern of electrodes are then dried and an adhesive layer is applied to the substrate sheet on which the electrodes are printed. A cover sheet of thermoplastic film is then placed over the substrate sheet (with the pattern of electrodes and the adhesive sandwiched therebetween), and the stack of layers is pressed to form a laminated sheet.

These and other features of the present invention will become readily apparent upon further review of the following specification and drawings.

BRIEF DESCRIPTION OF THE DRAWINGS

Similar reference characters denote corresponding features consistently throughout the attached drawings.

BEST MODES FOR CARRYING OUT THE INVENTION

Figure 1:
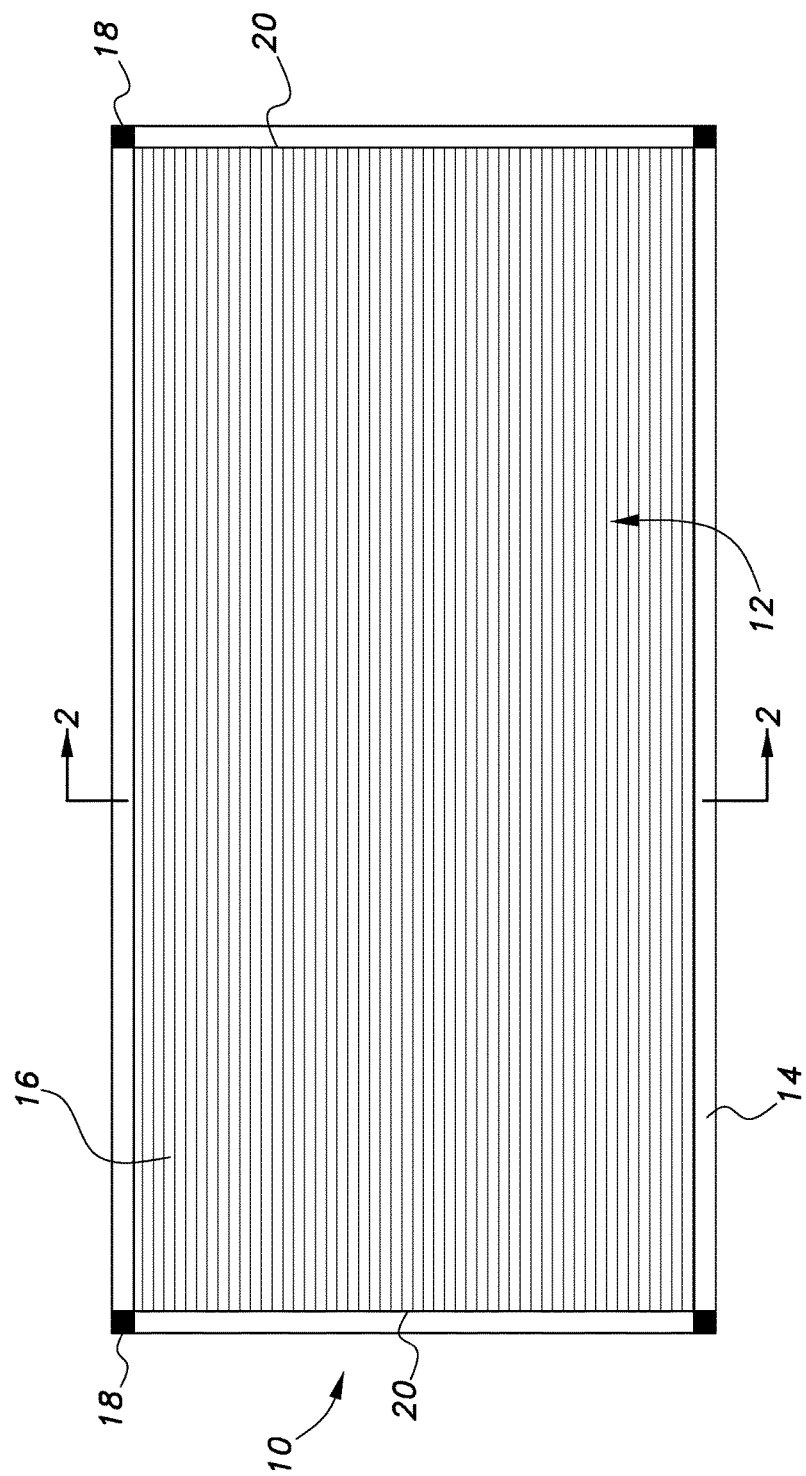
FIG. 1 is a plan view of the flexible dust shield according to the present invention.
Figure 2:
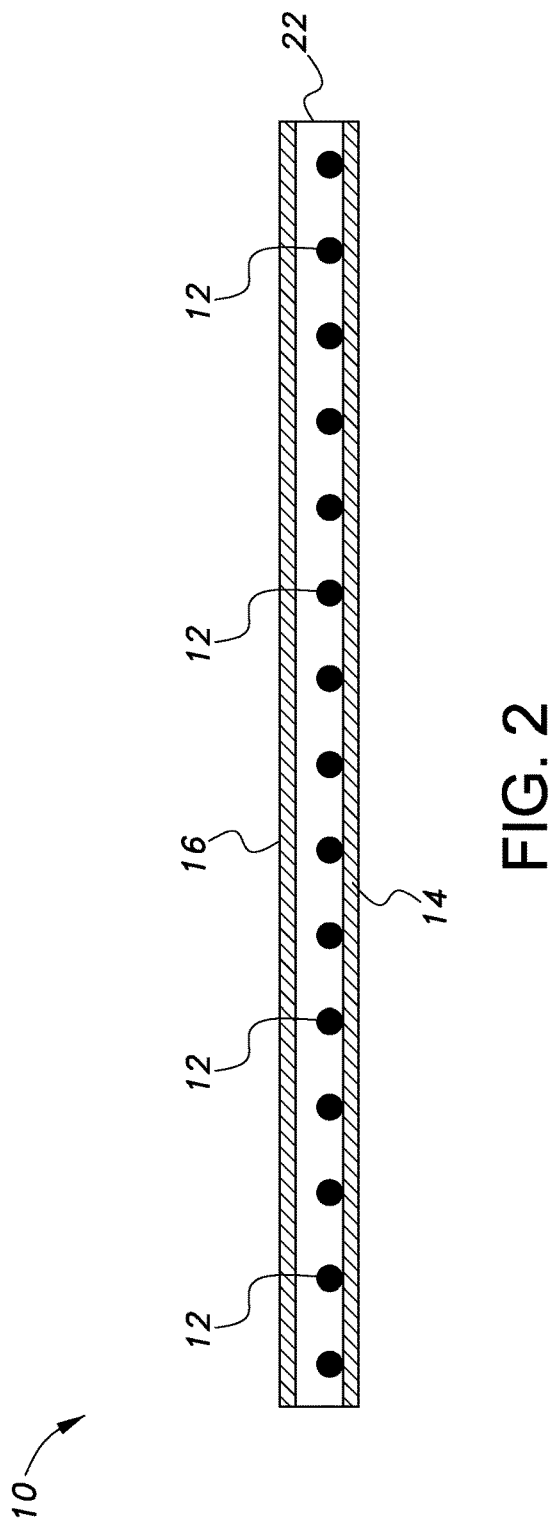
FIG. 2 is a cross-sectional side view of the flexible dust shield of FIG. 1, taken along sectional lines 2-2.

The flexible dust shield 10 can be applied to a surface for repelling dust particles therefrom by action of an electric field. For example, the flexible dust shield 10 can be applied to a surface of a photovoltaic solar collector panel, exposed glass surfaces of a high-rise building façade or the like. As shown in FIGS. 1 and 2, the dust shield 10 includes a pattern of electrodes 12 made from a conductive ink, such as silver ink or carbon ink, which is printed on a flexible substrate 14 made from a thermoplastic film. A cover sheet 16 of thermoplastic film is laminated to the substrate 14 over the pattern of electrodes 12. As shown, the electrodes 12 are preferably arrayed as parallel lines. The electrodes 12 are adapted for attachment to a single phase or multi-phase alternating current (AC) signal, which generates an electric field for repelling dust particles. In use, the single-phase or multi-phase AC signal produces a travelling electromagnetic wave. The electromagnetic field produced by the electrodes 12 lifts dust particles away from the shield 10 and repels charged particles. For example, the shield 10 can successfully repel dust when a two-phase alternating voltage (1 Hz, +/−10 kV) is applied to the device.

In FIG. 1, conventional contact pads 18 are shown on either end of the flexible dust shield 10, in electrical communication with the printed electrodes 12, although it should be understood that this arrangement is shown for exemplary purposes only and that the pattern of printed electrodes 12 may be connected to the external electrical power supply by any suitable type of connection. Contact pads 18 (and any connecting lines 20 between contact pads 18 and the electrodes 12) may also be printed on the substrate sheet 14 with the conductive ink. The flexible substrate 14 and the cover 16 may be formed from any suitable type of thermoplastic film. For example, a polyimide film, such as Kapton®, manufactured by E. I. du Pont de Nemours and Company of Delaware, may be used. Another example of a suitable type of thermoplastic film is a polyethylene terephthalate film. As noted above, any suitable type of conductive ink may be used for printing the pattern of electrodes 12. An example of such ink is 80 wt % dispersion of silver nanoparticles (3-7 nm) in decanol. The silver ink can have a dry thickness of about 5 μm.

It should be understood that the generally rectangular configuration of dust shield 10 shown in FIG. 1 is shown for exemplary purposes only, and that the overall contouring and relative dimensions of dust shield 10 may be varied dependent upon the size and shape of the photovoltaic solar collector panel, glass surface or the like to which the dust shield 10 is to be applied. As an example, for a rectangular dust shield 10 such as that shown in FIG. 1, substrate sheet 14 and cover 16 may each be 1200 mm by 600 mm sheets. For such exemplary dimensions, substrate sheet 14 may have an exemplary thickness of 0.005 inches, and cover 16 may have an exemplary thickness of 0.001 inches. If Kapton® is used as the exemplary thermoplastic material, Kapton® has a dielectric strength of 118 kV/mm. The contact pads can be 15 mm by 15 mm. The connecting line can have a width of 3 mm.

To make the flexible dust shield 10, the pattern of electrodes 12 are printed, e.g., screen-printed, on the flexible substrate sheet 14 of thermoplastic film using a conducting ink. As noted above, the contact pads 18 and any connecting lines between contact pads 18 and the electrodes 12 may also be printed on the substrate sheet 14 with the conductive ink at the same time. The printed pattern of electrodes 12 are then dried and an adhesive layer 22 is applied to the substrate sheet 14 on which electrodes 12 are printed. The adhesive layer is preferably a screen-printable adhesive. For an exemplary silver ink, with a 5 µm dry thickness, the printed pattern of electrodes 12 would be dried at approximately 230° C. for approximately one hour. The conductive ink and overall configuration of the flexible dust shield 10 are preferably selected such that a resistance between the electrodes 12 and the connecting lines 20 is less than 30Ω, and such that a resistance between contact pads 18 is greater than 30Ω.

The cover sheet 16 of thermoplastic film is then placed over the substrate sheet 14 (with the pattern of electrodes 12 and the adhesive 22 sandwiched therebetween), and the stack of layers is pressed to form a laminated sheet. As noted above, the pattern of electrodes 12 are printed using a conductive ink, such as a silver ink or a carbon ink, for example. Further, as noted above, the flexible substrate 14 and the cover 16 may be formed from any suitable type of thermoplastic film, for example a polyimide film, such as Kapton®, or a polyethylene terephthalate film.

It is to be understood that the present invention is not limited to the embodiments described above, but encompasses any and all embodiments within the scope of the following claims.

I claim:

1. A flexible dust shield, comprising:
   a flexible substrate, the substrate formed from a thermoplastic material;
   a pattern of electrodes on the substrate, the electrodes formed from a conductive ink, the electrodes being adapted for connection to an alternating current signal for producing an electric field for repelling dust particles; and
   a cover formed from a thermoplastic material, the cover extending over the pattern of electrodes and being laminated to the substrate.

2. The flexible dust shield as recited in claim 1, wherein said flexible substrate comprises a sheet of polyimide film.

3. The flexible dust shield as recited in claim 1, wherein said flexible substrate comprises a sheet of polyethylene terephthalate film.

4. The flexible dust shield as recited in claim 1, wherein said cover comprises a sheet of polyimide film.

5. The flexible dust shield as recited in claim 1, wherein said cover comprises a sheet of polyethylene terephthalate film.

6. The flexible dust shield as recited in claim 1, wherein said conductive ink comprises silver ink.

7. The flexible dust shield as recited in claim 1, wherein said conductive ink comprises carbon ink.

8. A method of making a flexible dust shield, comprising the steps of:
   printing a pattern of electrodes on a flexible substrate, the substrate being formed from a thermoplastic film;
   drying the printed pattern of electrodes;
   applying an adhesive to the substrate; and
   laminating a cover sheet of thermoplastic film to the substrate sheet with the printed electrodes disposed between the substrate sheet and the cover sheet.

9. The method of making a flexible dust shield as recited in claim 8, wherein the step of printing the pattern of electrodes on the flexible substrate comprises printing the pattern of electrodes on a polyethylene terephthalate film substrate.

10. The method of making a flexible dust shield as recited in claim 8, wherein the step of printing the pattern of electrodes on the flexible substrate comprises printing the pattern of electrodes on a polyimide film substrate.

11. The method of making a flexible dust shield as recited in claim 8, wherein the step of laminating the cover sheet of thermoplastic film to the substrate sheet comprises laminating a cover sheet of polyethylene terephthalate film to the substrate.

12. The method of making a flexible dust shield as recited in claim 8, wherein the step of laminating the cover sheet of thermoplastic film to the substrate comprises laminating a cover sheet of polyimide film to the substrate.

13. The method of making a flexible dust shield as recited in claim 8, wherein the step of drying the printed pattern of electrodes comprises heating the printed pattern of electrodes and the flexible substrate at 230° C. for one hour.

14. The method of making a flexible dust shield as recited in claim 8, wherein the step of printing the pattern of electrodes on the flexible substrate comprises screen-printing the pattern of electrodes on the flexible substrate.

15. The method of making a flexible dust shield as recited in claim 8, wherein the step of printing the pattern of electrodes on the flexible substrate sheet of thermoplastic film comprises printing the pattern of electrodes with a conductive ink on the flexible substrate.

16. The method of making a flexible dust shield as recited in claim 15, wherein the step of printing the pattern of electrodes on the flexible substrate comprises printing the pattern of electrodes with silver ink on the flexible substrate.

17. The method of making a flexible dust shield as recited in claim 15, wherein the step of printing the pattern of electrodes on the flexible substrate sheet of thermoplastic film further comprises printing the pattern of electrodes with carbon ink on the flexible substrate.

* * * * *